United States Patent [19]

Arndt et al.

[11] Patent Number: 5,505,918
[45] Date of Patent: Apr. 9, 1996

[54] METHOD FOR MANUFACTURING ALKALI CHROMATES FROM CHROMIUM ORE

[75] Inventors: Uwe Arndt, Aires, Argentina; Michael Batz, Leichlingen, Germany; Rainer Bellinghausen, Köln, Germany; Hans-Dieter Block, Leverkusen, Germany; Heinrich Helker, Krefeld, Germany; Norbert Lönhoff, Leverkusen, Germany; Hans-Heinrich Moretto, Leverkusen, Germany; Hans-Georg Nieder-Vahrenholz, Pulheim, Germany; Hans Rinkes, Köln, Germany; Bernhard Spreckelmeyer, Leverkusen, Germany; Rainer Weber, Odenthal, Germany

[73] Assignee: Bayer Aktiengesellschaft, Leverkusen, Germany

[21] Appl. No.: 314,553

[22] Filed: Sep. 28, 1994

[30] Foreign Application Priority Data

Sep. 30, 1993 [DE] Germany .............. 43 33 350.8

[51] Int. Cl.⁶ .................................................. C01G 37/14
[52] U.S. Cl. .............................................. 423/61; 423/596
[58] Field of Search ......................... 423/61, 596

[56] References Cited

U.S. PATENT DOCUMENTS

| 3,095,266 | 6/1963 | Lander et al. | 423/61 |
| 3,336,102 | 8/1967 | Hultman et al. | 423/61 |
| 4,162,295 | 7/1979 | Subbanna et al. | 423/61 |
| 4,244,925 | 1/1981 | Subbanna et al. | 423/61 |
| 5,374,408 | 12/1994 | Bruzzone et al. | 423/61 |

FOREIGN PATENT DOCUMENTS

| 1352978 | 5/1974 | United Kingdom . |
| 1359849 | 7/1974 | United Kingdom . |

OTHER PUBLICATIONS

Derwent Abstract of SU0412149 (Jul. 23, 1971).

Primary Examiner—Steven Bos
Attorney, Agent, or Firm—Sprung Horn Kramer & Woods

[57] ABSTRACT

A method for manufacturing alkali chromates by the reacting of chromium ore with alkali compounds and oxidation in an atmosphere containing at least 50% oxygen is described, in which the mixture consisting of chromium ore, alkali compound and optionally leaning materials is heated in a first stage in an atmosphere containing not more than 5 vol. % oxygen to a temperature between 1000° and 1 400° C., and in a second stage is oxidized at a lower temperature of 900° to 1 070° C. with supply of an atmosphere containing at least 50% oxygen.

9 Claims, 6 Drawing Sheets

METHOD FOR MANUFACTURING ALKALI CHROMATES FROM CHROMIUM ORE

BACKGROUND OF THE INVENTION

The present invention relates to a method for manufacturing alkali chromates by the reacting of chromium ore with alkali compounds and oxidation with oxygen-containing gases.

It is known to react chromium ore by roasting with alkali compounds to alkali chromates at temperatures of 900° to 1100° C. The reacting takes place conventionally in directly heated revolving tubular kilns. The reaction proceeds, depending on the alkali compound used, mainly according to the following overall reaction equations (1), (2) and/or (3):

$$4\ FeCr_2O_4 + 8\ Na_2CO_3 + 7\ O_2 \rightarrow 8\ Na_2CrO_4 + 2\ Fe_2O_3 + 8\ CO_2 \quad (1)$$

$$4\ FeCr_2O_4 + 16\ NaOH + 7\ O_2 \rightarrow 8\ Na_2CrO_4 + 2\ Fe_2O_3 + 8\ H_2O \quad (2)$$

$$4\ FeCr_2O_4 + 16\ NaHCO_3 + 7\ O_2 \rightarrow 8\ Na_2CrO_4 + 2\ Fe_2O_3 + 16\ CO_2 + 8\ H_2O \quad (3)$$

Difficulties arise in the carrying out of this reaction because of the fact that intermediately low-melting mixtures are obtained, which on the one hand lead to sticking of the reaction mixture to the reactor walls and to granulation and on the other hinder the access of oxygen into the reaction compound, so that the reaction occurs only with limited space/time yield and incompletely.

Improvements to the method concern in particular the addition of leaning materials to the reaction mixture, in order on the one hand to prevent the sticking to the reactor walls and the granulation and on the other also to facilitate the access of oxygen. Other method improvements concern the raising of the oxygen content in the oxygen-containing gas, see e.g. U.S. Pat. No. 3,095,266, U.S. Pat. No. 3,733,389, U.S. Pat. No. 4,162,295 and U.S. Pat. No. 4,244,925. The use as oxygen-containing atmosphere of pure oxygen has also already been considered. In this case a direct or indirect electrical heating of the roasting kiln or an indirect heating with burner is necessary. However, very high demands have to be placed on the thermally conductive materials for the kiln construction, so that preferably revolving tubular kilns heated directly by the burning of carbon-containing materials have continued to be used (U.S. Pat. No. 4,244,925, column 4, lines 56 to 62), wherein the mixing of the oxygen-containing gases with the burner waste gases has been accepted. Moreover it is necessary according to the known methods to pass through the kiln far more oxygen than is necessary for the oxidation reaction, in order to maintain a high oxygen content in the kiln atmosphere. Even with indirect heating of the revolving tube and feeding of pure oxygen according to WO 91/17 118 a rarefaction of the kiln atmosphere as a result of the gases released during the calcination is accepted.

There have already been proposals (DE patent 544 086) that the reaction given above according to equation (1) be separated locally into two stages, wherein in the first stage mainly $CO_2$ is released and the oxidation takes place mainly in the 2nd stage, so that leaning material-free operation is possible.

According to DE 544 086 as low a temperature as possible in the range from 800° to 900° C. is to prevail in the calcination stage, in order that leaning material-free operation is possible. A further heating in the oxidation stage to 900° to 1100° C. is therefore necessary, so that the oxidation takes place in an oxygen atmosphere rarefied by the burner waste gases at a relatively slow oxidation rate.

SUMMARY OF THE INVENTION

The present invention provides a method for manufacturing alkali chromates by the reacting of chromium ore with alkali compounds and oxidation in an atmosphere containing at least 20%, preferably at least 50%, oxygen, which is characterised in that the mixture consisting of chromium ore, alkali compound and optionally leaning material is heated in a first stage in an atmosphere containing not more than 5 vol. %, preferably not more than 2 vol. %, oxygen to a temperature between 1000° and 1400° C., preferably 1100° to 1400° C., and in a second stage is oxidised at a lower temperature of 900° to 1070° C. with feeding of an atmosphere containing at least 50 vol. %, preferably at least 70 vol. %, particularly preferred at least 80 vol. %, oxygen.

It has been found that the high temperature of the calcination stage (1st stage) ensures a very high reaction rate of the soda with $Al_2O_3$, $Cr_2O_3$ and $Fe_2O_3$ with the splitting off of $CO_2$ and formation of very high-melting solid $NaAlO_2$, $NaFeO_2$ and $NaCrO_2$, so that sticking and granulation of the decomposition mixture by virtue of the intermediately melting soda (melting temperature 847° C.) cannot occur and in addition the oxidation stage (2nd stage) takes place without further supply of heat (i.e. autotherm).

This permits both a direct heating favourable in energy terms by hot flame gases only in the 1st stage and an attainment of high oxygen contents in the atmosphere of the 2nd stage, without any indirect heating being required.

According to the invention, therefore, preferably the calcination is carried out with direct heating by the combustion of carbon-containing material and the oxidation stage is carried out without external heat supply, wherein a mixing of the atmospheres of the two stages is largely prevented by suitable measures.

The oxygen content in the calcining stage is to be kept sufficiently low that the formation of $Na_2CrO_4$ does not occur in the main.

Preferably the oxygen content in the calcining stage is to be less than 1%. Particularly preferably the atmosphere is to be oxygen-free in the main.

The following reactions take place in the main in the two stages:

Calcining stage: (4)

$(Mg, Fe^{II})(Fe^{III}, Al, Cr^{III})_2O_4 + Na_2CO_3 \longrightarrow$ $(Mg, Fe^{II})O + 2\ Na(Fe^{III}, Al, Cr^{III})O_2 + CO_2$ Oxidation stage:

$2\ NaCrO_2 + 2Na(Fe^{III}, Al)O_2 + 3/2\ O_2 \longrightarrow$ (5a)

$2\ Na_2CrO_4 + (Fe^{III}, Al)_2O_3$ and $Cr_2O_3 + 4Na(Fe^{III}, Al)O_2 + 3/2\ O_2 \longrightarrow$ (5b)

$2\ Na_2CrO_4 + 2(Fe^{III}, Al)_2O_3$

Chromium ore and soda are preferably used with an average particle size of less than 60 μm, preferably between 5 and 30 μm. The low particle size is in particular suitable for avoiding a granulation by virtue of the intermediately melting soda. The bigger the melted soda droplets are, the longer the solid-liquid reaction according to equation (4) lasts and the greater the probability becomes that a soda droplet will react in contact with several ore particles, which are then virtually "welded".

There are used as chromium ore, ores with a $Cr_2O_3$ content of 40 to 47 wt %, which contain as further components iron oxide, aluminium oxide and magnesium oxide together with smaller proportions of silicon dioxide and other constituents of natural minerals typically in amounts of less than 1 wt %.

In particular soda is used as alkali compound. Use can in addition also be made of certain amounts of sodium hydroxide and/or sodium hydrogencarbonate in order to influence the initial melting behaviour and to accelerate the initial reaction. In general, however, soda is used as the sole alkali compound.

Chromium ore and alkali compound are used roughly stoichiometrically according to the overall reaction equation given in the preamble. A superstoichiometric use of alkali leads in general not to a completion of the reaction, but to a discharging of non-reacted alkali. Since the chromium in the chromium ore is included in the solid matter, complete conversion to sodium chromate in industrially justifiable reaction times is generally not possible. Allowance can be made for this by slightly substoichiometric use of alkali in order to economize on alkali. It is endeavoured to use just so much alkali that the latter is just completely converted taking into account the incomplete conversion of chromium, without an alkali shortfall occurring in terms of the achievable conversion to chromium. Depending on the nature of the chromium ore used, the temperature in the revolving tubular kiln and the reaction time, it is possible according to the invention to convert 90 to 99% of the chromium contained in the ore.

In particular it is intended according to the invention that ideally the whole of the soda reacts in the calcining stage, it being sufficient in an industrial process if at least 95%, preferably 98%, of the soda reacts with the splitting off of $CO_2$.

In addition, iron(II) present in the ore can be oxidised to iron(III) by pre-heating in oxygen-containing atmosphere, prior to the carrying out of the 1st stage, to a temperature between 400° and 800° C., e.g. with recovery of heat from the flue gases of the direct heating of the 1st stage.

Both the calcination at the high temperature according to the invention and the oxidation with the high oxygen content according to the invention of the atmosphere occur virtually instantaneously. In practice the residence time in the calcining stage is dependent on the heating time to the temperature according to the invention. The latter is naturally longer the higher the layering of the decomposition mixture in the reactor is. The layering of the decomposition mixture can in a directly heated revolving tubular kiln on an industrial scale of e.g. 50 m length and 5 m diameter be up to 120 cm high. Residence times of 2 to 3 hours are then optionally also necessary with pre-heating of the decomposition mixture to temperatures of 400° to 800° C.

In revolving tubular kilns up to 30 m in length and approx. 3 m in diameter the residence time can be limited to 0.5 to 2 hours.

The residence time and the layering height can be optimized by suitable inclination of the revolving tube axis and/or choice of the speed of rotation of the revolving tube, while maintaining the throughput capacity coordinated with the heating capacity of the burner.

With heating times of over 2 hours it can be advantageous according to the invention to also use leaning materials in an amount of 50 to 150 wt %, referred to ore, in order to exclude the risk of granulation of the decomposition mixture. With long heating times, in fact, the temperature range around the melting temperature of soda (847° C.) is passed through only very slowly by virtue of the endothermal nature of the calcination reaction, so that in the absence of leaning materials sticking or granulation can occur by virtue of the non-definite melting of the soda.

With residence times of less than 2 hours, preferably less than 1 hour, the temperature range around the melting temperature of soda is generally passed through sufficiently rapidly, so that despite the endothermal nature of the $CO_2$ release reaction a sufficiently rapid reaction takes place, so that no significant granulation occurs. However, the additional use of up to 50 wt % of leaning materials, referred to ore, can balance out local fluctuations in the distribution of soda and ore in the mixture, since a local excess of soda likewise presents the risk of local granlation.

In general, if the low oxygen content according to the invention in the calcining stage and a sufficiently small particle size are observed, the use of increased amounts of leaning materials can also be foregone with residence times of more than 2 hours in the 1st stage, since the granulation takes place on such a small scale that it is still tolerable in the 2nd stage.

The mainly soda-free decomposition mixture leaves the calcining stage at a temperature of 1000° to 1400° C. and is transferred into the oxidation stage. The end temperature of the calcining stage is selected as a function of the particular equipment setup in such a way that the inlet temperature into the oxidation stage does not exceed 1150° C. preferably 1100° C. If the two stages are carried out in a single apparatus, the outlet temperature of the calcining stage preferably lies in the lower temperature range. If they are carried out in separate apparatuses, the outlet temperature of the calcining stage preferably lies in the upper temperature range, so that heat losses in the transfer apparatus between the two stages can be absorbed.

In each case, with a given equipment setup, the outlet temperature of the calcining stage must be selected so that (even with an inlet temperature into the oxidation stage of slightly more than 1070° C.) a temperature of less than the maximum temperature of 1070° C. is rapidly reached in the oxidation stage.

The oxidation takes place, referred to the individual particles, in a very short time. A limiting factor for the necessary residence time in the oxidation stage is the layering of the decomposition mixture, due to which the free access of oxygen is restricted.

Short residence times of 5 to 15 minutes in the oxidation stage can be achieved if a layer thickness of the decomposition mixture of 8 mm, preferably 5 mm, is not exceeded.

Such process conditions can be attained by means of thin-film roller reactors or in small revolving tubes with a length of 1 to 5 m and a diameter of ⅛ to 1/12 of the length, wherein the latter can be combined in the form of tube bundles in order to achieve industrial capacities.

Larger revolving tubes with a length of 20 to 50 m and diameters of 2 to 5 m require for the achievement of economic space/time yields greater layer thicknesses of the decomposition mixture, which can come for example to 20 to 80 cm, so that residence times of 30 to 60 minutes are required for the oxidation. The required residence time can be reduced with higher layering if the oxidation oxygen is introduced into the layer of the decomposition mixture by means of below-bed nozzles.

Since no intermediately liquid phases are produced in the oxidation stage, there is no fear of granulation of the decomposition mixture, so that leaning materials are not necessary in order to prevent granulation.

The rate of oxidation can however be influenced beneficially by increasing the proportion of porous solid phase in the decomposition mixture, since the liquid sodium chromate produced is adsorbed on the porous solid phase (leaning material) and the access of oxygen to not yet oxidized ore particles reacted with soda is hindered less by the already formed liquid phase.

Preferably the proportion of leaning material is limited to not more than 50 wt % referred to ore, unless the calcination stage already contains higher proportions of leaning materials. In each case the leaning material is mixed with the decomposition mixture prior to the 1st stage, optionally already prior to the pre-heating.

Preferably pure oxygen is introduced into the oxidation stage in counter-flow to the decomposition mixture. The amount of oxygen required can in theory be limited to the oxygen demand required for the reaction according to reaction equations (5a) and (5b). In order to allow for fluctuations over time, however, it is advantageous to use a slight excess of oxygen. In order to avoid the loss of pure oxygen, it is advisable to mix the pure oxygen with a proportion of air, wherein the pure oxygen supplied is limited to the maximum stoichiometric amount of oxygen required. According to the invention the oxygen-containing gas must however contain at least 50% oxygen, preferably at least 80%.

According to the invention directly fired revolving tubular kilns, shaft kilns, fluidized-bed kilns or double-deck kilns can be used for carrying out the method according to the invention in the 1st stage. Revolving tubular kilns are preferably used.

There are suitable for carrying out the 2nd stage of the method according to the invention the same reactors as for the first stage, together with revolving bundle reactors and thin-film roller reactors.

If revolving tubes are used in both stages, both stages of the method according to the invention are preferably carried out in a uniform revolving tube. This preferred method variant is characterised in that between the 1st and 2nd stages a separation of the gas atmosphere is provided, i.e. that a mixing of the kiln atmosphere of stages 1 and 2 is suppressed, ideally even prevented. The heating of the revolving tube takes place by corresponding positioning of the burner in the region of the revolving tube in which the 1st stage is carried out.

The separation of the kiln atmosphere can be attained by corresponding mechanical baffles. For example, baffles can be provided normal to the revolving tube axis which ensure the passage only of the material for roasting, but largely prevent a gas flow between revolving tube zones in which stages 1 and 2 are carried out. It is also possible, by means of a tube extending parallel to the revolving tube axis within the revolving tube across the zone of the revolving tube in which stage 2 is carried out, to so restrict the inner cross-section of the revolving tube that an approximate plug flow consisting of air enriched with oxygen or oxygen is maintained, wherein the oxygen-rich atmosphere is so metered from the outlet end of the revolving tube that the oxygen is in the main completely consumed during the flow through the revolving tube zone for stage 2.

According to a particularly preferred embodiment of the separation of the gas atmospheres the oxygen is introduced via below-bed nozzles through the brick lining of the revolving tube directly into the heap of the material to be oxidized. The separation of the kiln atmosphere is then carried out by the surface of the heap itself, if substantially more oxygen is not introduced than is consumed for the oxidation in the heap.

If both stages are carried out in separate apparatuses, it is preferable to carry out the first stage in a revolving tube and to use for the second stage an apparatus which permits an oxidation with small layer thickness and short residence time of the decomposition mixture in revolving tube bundle reactors or thin-film roller reactors.

The invention will be explained in detail below by means of the attached figures.

BRIEF DESCRIPTION OF THE DRAWINGS

Identical symbols in the various figures refer to mutually corresponding elements, unless stated otherwise.

Figure 1:
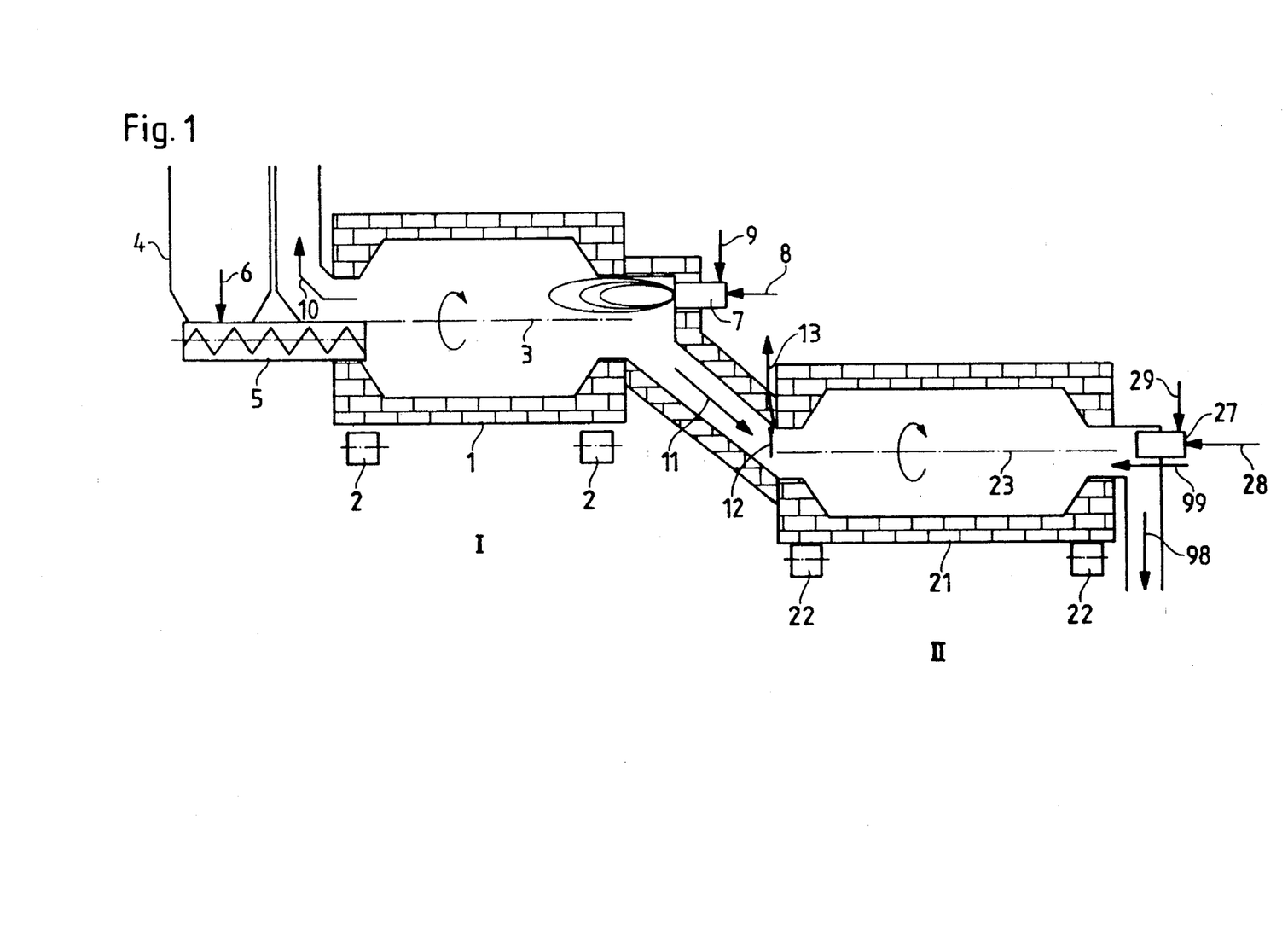
FIG. 1 shows an apparatus for carrying out the method using 2 revolving tubes.

FIG. 1 shows a revolving tubular furnace 1 for carrying out the first stage I, which is supported on driven rollers 2, so that it rotates about the axis 3.

From a silo 4 the revolving tube 1 is loaded continuously with the decomposition mixture via a worm 5 in the direction of the arrow 6. The heating of the revolving tube 1 takes place by means of burner 7, to which, indicated by arrows, fuel 8 and combustion air 9 are fed. The flue gases and released $CO_2$ leave the revolving tubular kiln along arrow 10.

Preferably the heat from the flue gases is used for the pre-heating of the decomposition mixture, optionally with the addition of atmospheric oxygen for the pre-oxidation of the decomposition mixture. The calcined decomposition mixture passes along arrow 11 into the second, non-heated revolving tubular kiln 21 for the carrying out of the second stage II. The latter is supported on rollers 22 for rotation about the axis 23. The oxidation oxygen is fed along arrow 99. Excess oxygen-containing gas is withdrawn at the inlet end for the decomposition mixture at 13. The mixing of the oxygen-containing atmosphere of stage II with the in the main oxygen-free atmosphere of stage I is prevented by an articulated flap 12. Sodium chromate-containing kiln material is discharged along arrow 98 and fed to the leaching of the sodium chromate. There is also provided for the start-up of the revolving tube 23 a pre-heating burner 27 with fuel and air feeds 28 and 29, in order to pre-heat the revolving tube prior to the first filling with calcined decomposition mixture to the operating temperature of 950° to 1070° C.

Figure 2:
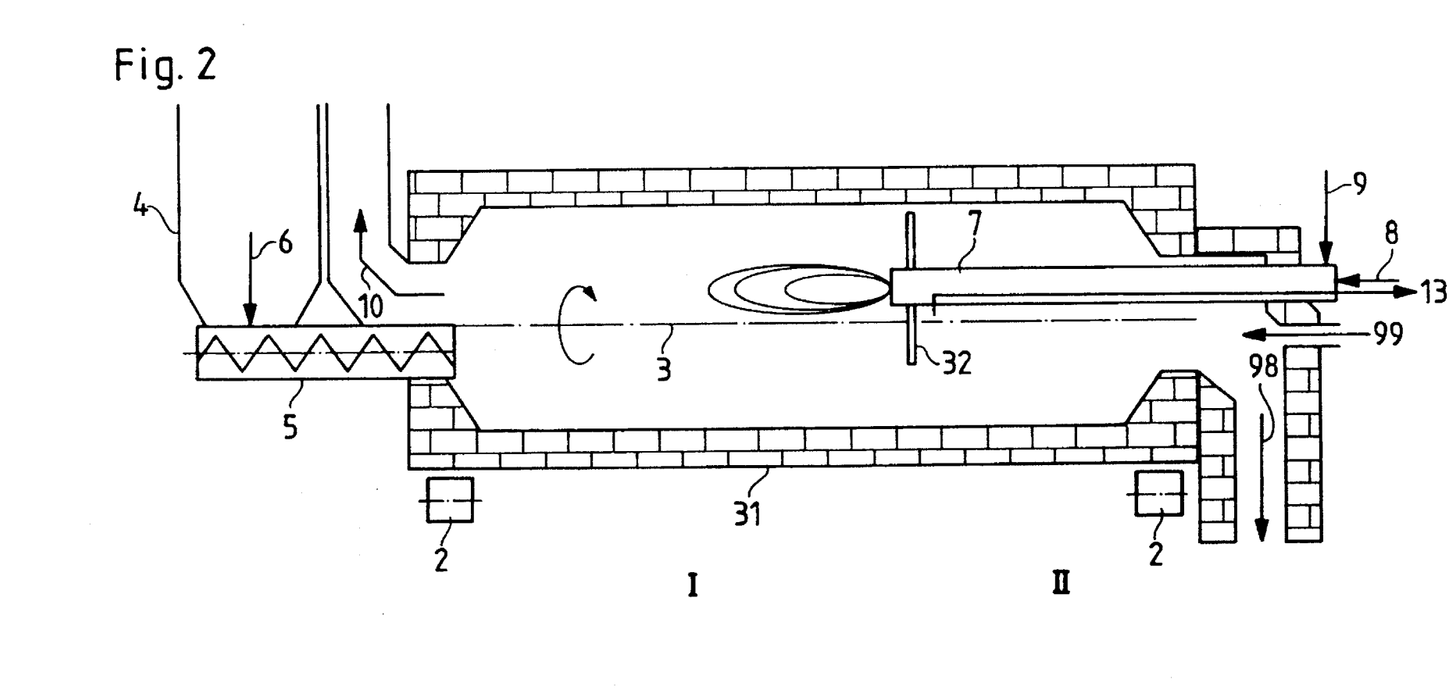
FIG. 2 shows a revolving tube with atmosphere separation between both stages.

FIG. 2 shows a uniform revolving tubular kiln 31 for carrying out the two stages I and II. The burner 7 is pushed into the revolving tube to a distance such that the section of the revolving tube in which the calcining stage is carried out is heated. A screen 32 is provided for preventing the mixing of the atmospheres from the two sections.

Figure 3:
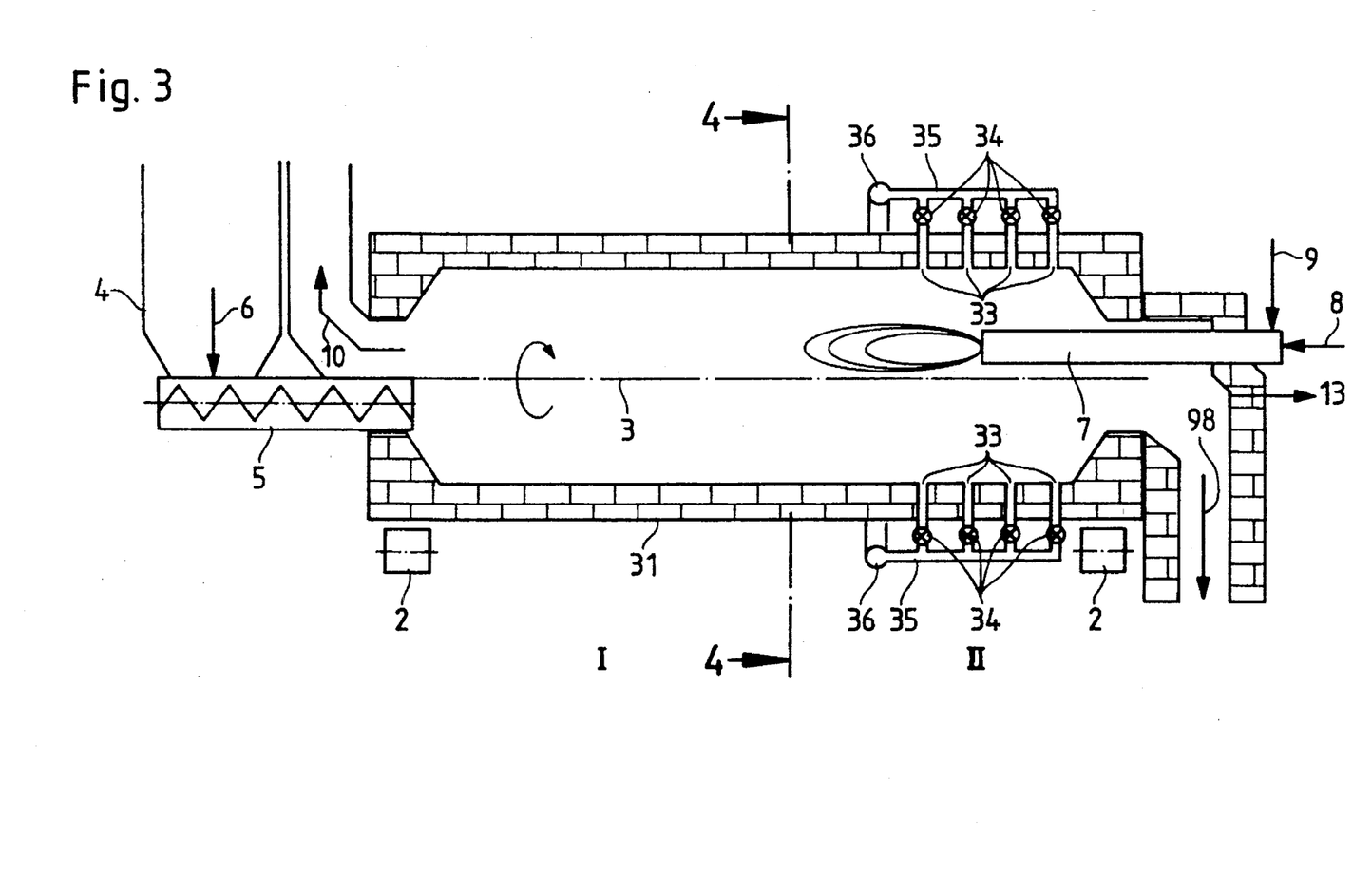
FIG. 3 shows a revolving tube with oxygen entry through below-bed nozzles into the oxidation stage.

FIG. 3 shows a uniform revolving tubular kiln 31 for the two stages I and II, wherein the oxygen supply takes place by means of below-bed nozzles 33 arranged on the generated surface of the revolving tube 31 in the region II. The below-bed nozzles 33 are fed by paraxial supply lines 35 and a circular pipeline 36 arranged around the revolving tube axis 3.

The valves 34, which connect the below-bed nozzles 33 to the supply lines 35, are so controlled that oxygen is supplied only if the respective below-bed nozzle is covered with decomposition mixture. In addition only so much oxygen is supplied as is consumed during passage through the decomposition mixture. In order that the oxygen content of the atmosphere in the region I does not rise above the content tolerable according to the invention, excess oxygen is optionally discharged by means of a suction device along arrow 13.

Figure 4:
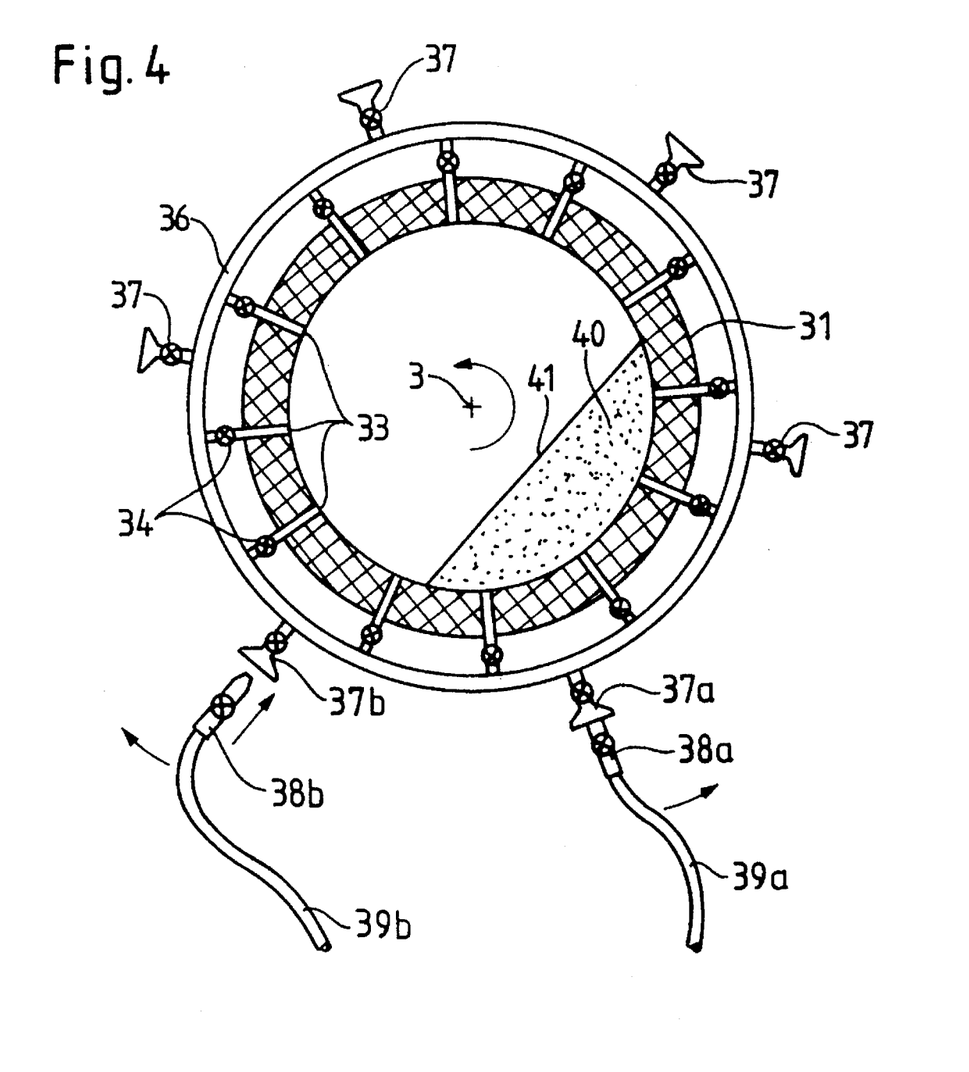
FIG. 4 shows a cross-section A—A through the apparatus according to FIG. 3.

FIG. 4 shows a section A—A through the revolving tube according to FIG. 3.

The supplying of the below-bed nozzles 33 with oxygen takes place via a circular pipeline 36 connected firmly to the revolving tube surface, i.e. rotating together with it, via connecting pipes 35 (FIG. 3) and valves 34.

The circular pipeline 36 comprises contact valves 37 distributed over the periphery, to which flexible lines 39a and 39b can be connected by means of contact valves 38a and 38b. At least one of the valves 38a and 38b is connected alternately to one of the valves 37 (here 37a) and is carried along by the circular pipeline 36 rotating with the revolving tube to such an extent as the flexible line 39a permits. The respective valve connection is slackened by manipulators (not shown), the valve 37 (here 37b) is moved back against the direction of rotation of the revolving tube and connected to the next available valve 37 (here 37b).

Figure 5:
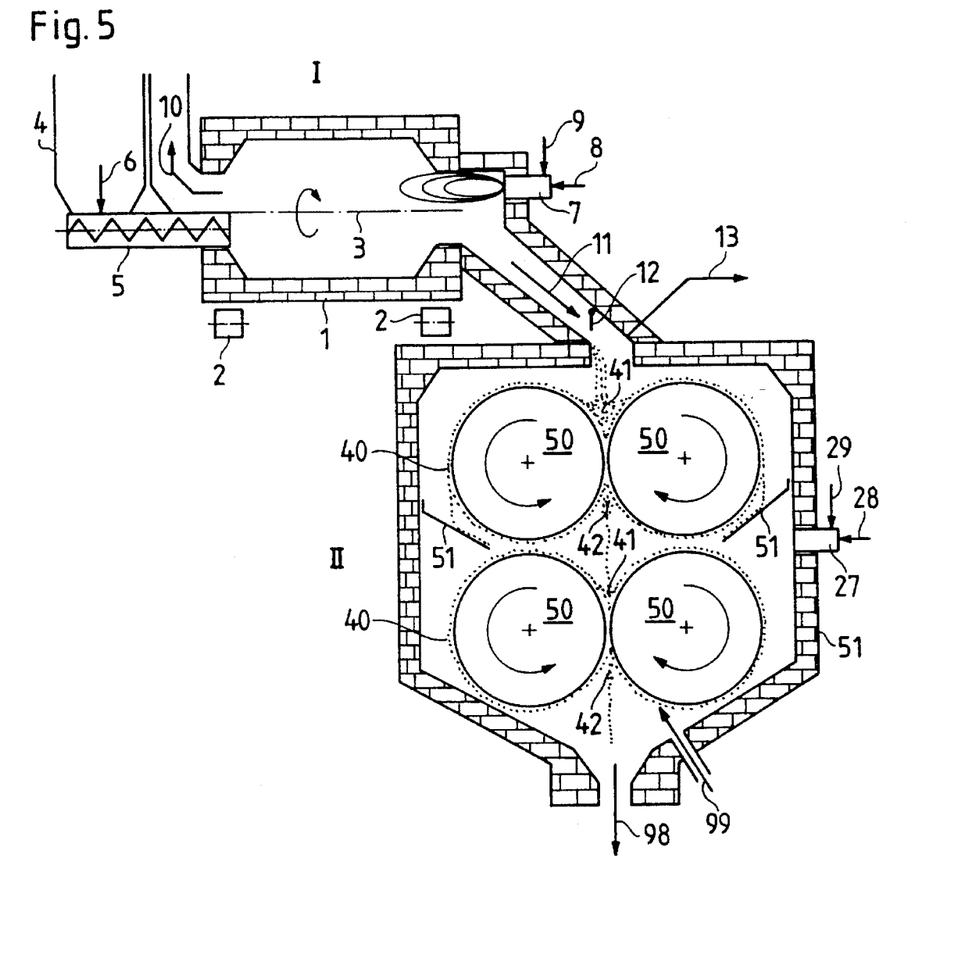
FIG. 5 shows an arrangement with thin-film roller reactor for the oxidation stage.

FIG. 5 shows an arrangement in which the second stage (II) is carried out in a thin-film roller reactor. The latter consists of rollers 50 which are arranged next to one another in pairs, almost touching one another and rotating in counter-direction to one another. The decomposition mixture leaving the first stage along arrow 11 drops into the channel 41 formed by the upper roller pair and is by virtue of the rotation of the rollers 50 with formation of a film 40 on the peripheral surface of the rollers 50 carried along by said rollers and drops off below the roller pair in the region of the spandrel 42. In the embodiment shown here consisting of two superimposed roller pairs the partially oxidized decomposition mixture drops out of the spandrel 42 of the upper roller pair into the channel 41 of the lower roller pair. Optionally additional baffle plates 51 can be provided for collecting optionally dripping melt.

One or more burners 27 are provided for the start-up of the thin-film roller reactor. The rollers 50 are located in a thermally insulated housing 51.

Figure 6:
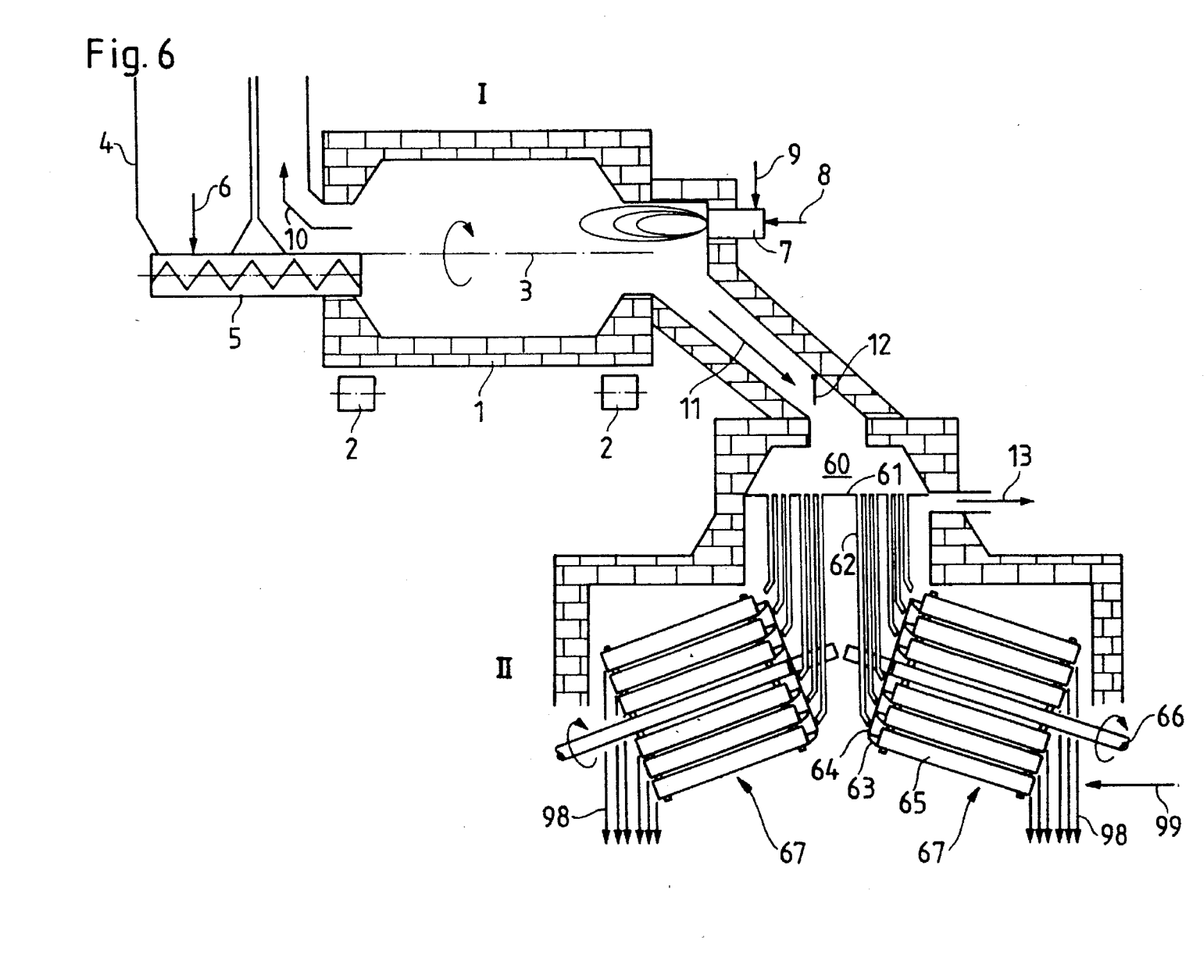
FIG. 6 shows an arrangement with revolving tube bundle reactor for the oxidation stage.

FIG. 6 shows an apparatus according to the invention in which the oxidation stage is carried out in tube bundle reactors. Each tube bundle 67 consists of a multiplicity of tubes 65 arranged concentrically about the axis of rotation 66, which rotate in common about the axis 66. 6 tubes of each tube bundle 67 are shown, which lie in the plane of the axis 66. Each of the tube bundles 67 shown comprises 36 tubes 65.

The calcined decomposition mixture leaves the first stage along arrow 11 and drops into an intermediate bunker 60, which comprises a distribution bottom 61, and enters optionally after distribution by means of a distribution unit (not shown) the feed lines 62, which corresponds to the number of the tubes 65. At the inlet end of the tube bundle 67 there are provided, via a linked rod assembly 64 connected firmly to the axis 66, chutes 63, wherein each chute is assigned to a particular tube 65. The chutes 63 are each fixed rotatably to the linked rod assembly 64 above their centre of gravity, so that their opening always points upwards during the rotation of the linked rod assembly 64 about the axis 66. During the rotation of the tube bundle 67 about the axis 66 each chute 63 is assigned to a particular supply line 63 in time. A product flow consisting of sodium chromate-containing kiln material leaves each tube 65 along the arrows 98.

We claim:

1. A method for manufacturing alkali chromates wherein a mixture consisting of chromium ore, alkali compound and optionally leaning materials is heated in a first stage in an atmosphere containing not more than 5 vol. % oxygen to a temperature between 1,000° and 1,400° C., and in a second stage, is oxidized at a temperature lower than that of the first stage and in the range of 900° to 1,070° C., with supply of an atmosphere containing at least 50 vol. % oxygen.

2. Method according to claim 1, characterized in that the second stage is carried out without external heat supply.

3. Method according to claim 1, wherein said mixture is in the form of particles with an average particle size of 5 to 60 μm.

4. Method according to claim 1, wherein leaning materials in an amount of not more than 50 wt. %, by weight of chromium ore, are present in said mixture.

5. Method according to claim 1, wherein said mixture, when entering said second stage, is in the form of a layer having a layer thickness of not more than 8 mm.

6. Method according to claim 1, wherein, prior to being heated in said first stage, said mixture is preoxidized in an oxygen-containing atmosphere at a temperature between 400° and 800° C.

7. Method according to claim 1, wherein said mixture being heated in said first stage is in the form of a layer having a layer thickness of 20 to 120 cm.

8. Method according to claim 5, wherein the second stage is carried out in a thin-film roller reactor or revolving tube bundle reactor.

9. Method according to claim 1, characterized in that the first stage and the second stage are performed jointly in a revolving tube, but in separate zones, wherein in the zone for carrying out the second stage, oxygen-containing gas is introduced into said mixture through nozzles located beneath said mixture.

* * * * *